United States Patent
Mitterauer

(10) Patent No.: US 6,697,789 B2
(45) Date of Patent: Feb. 24, 2004

(54) COMPUTER SYSTEM, PARTICULARLY FOR SIMULATION OF HUMAN PERCEPTION VIA SENSE ORGANS

(76) Inventor: Bernard Mitterauer, Autobahnweg 59, A-5071, Wals bei Salzburg (AT)

( * ) Notice: Subject to any disclaimer, the term of this patent is extended or adjusted under 35 U.S.C. 154(b) by 326 days.

(21) Appl. No.: 09/847,824

(22) Filed: Jul. 5, 2001

(65) Prior Publication Data

US 2003/0024518 A1 Feb. 6, 2003

(30) Foreign Application Priority Data

May 2, 2000 (DE) .......................... 100 21 369
Sep. 22, 2000 (DE) .......................... 100 47 187

(51) Int. Cl.[7] .......................... G06F 15/18; G06F 17/00
(52) U.S. Cl. .............................. 706/12; 706/11; 706/14
(58) Field of Search ................ 706/12, 11, 14

(56) References Cited

U.S. PATENT DOCUMENTS 5,734,373 A * 3/1998 Rosenberg et al. ......... 345/161

FOREIGN PATENT DOCUMENTS

DE 3707998 9/1988

* cited by examiner

Primary Examiner—George B. Davis
(74) Attorney, Agent, or Firm—Milde & Hoffberg, LLP

(57) ABSTRACT

The computer system includes a receptor field (2) with sensors ($R_i$) each of which receives data with specific characteristic (A, B, C). These data are passed to processors ($P_i$, $P_{i/k}$), whereby only those connections ($L_i$) between sensors and processors are released that are suited to an evaluation of the data according to a combination of specific data dictated by a phase program of a phase program circuit (7). The computer system also includes a selector circuit (71) that discards those program commands from dictated program commands (73) that lead to a "senseless" computation result. A motor program circuit (8) for the control of effectors (9) may be connected to the computer system that at least contribute to the movement of the receptor field (2) in order to bring the receptor field closer to suitable data with specific characteristics in order to enable better execution of the program.

11 Claims, 3 Drawing Sheets

COMPUTER SYSTEM, PARTICULARLY FOR SIMULATION OF HUMAN PERCEPTION VIA SENSE ORGANS

BACKGROUND OF THE INVENTION

The invention concerns a computer system used to determine and evaluate data or groups of data, each of which includes a specific characteristic, particularly for simulation of human perception via sense organs.

In robotics, one is concerned with computer systems that deal with handling processes based on external or internal data with the help of a specific program, and that pass the calculation results on to actuators, effectors, or generally to a motor control unit, for example, so that work is performed by the robot automatically and independently. A further goal is to build "learning" robots, i.e., to configure the computer system so that that it expands or restructures existing programming based on external data in order to optimize the assigned task and more effectively perform it.

Examples for such computer systems are neural net computers that simulate the processes in regions of the human brain based on external stimulation, and that produce corresponding calculation results.

German patent DE-C2-3707998, of which the applicant is a co-inventor, makes a step in this direction. In the computer system presented there, an attempt is made to at least partially emulate the neuron brain structure. For this, the computer system includes a number of node computers that correspond to neurons in the human brain, and bi-directional information conductors connecting the node computers that correspond to dendrites in the human brain. This computer serves to calculate the environment-related self-awareness, and is organized permutographically, whereby, in principle, each node computer can assume the command control of all computation operations of the entire computer. This achieves a degree of potential command execution redundancy that has actually been observed for neurons in the human brain.

Along with this permutographically-organized computer, an additional keno-grammatically-organized computer is provided that communicates with the permutogaph-computer via compilers. The kenograph computer simulates the neuroglia that have been proved to be responsible for information transfer between individual neurons and for the observed restructuring in the neuron aggregate.

The calculation results achieved by this complex computer system are represented as a path through the computer system.

A particular problem in "learning" robots is the simulation of perceptions via sense organs. If a computer system with a corresponding structure and program that simulated human perception were available here, the evaluation of the output signals from sensors, whether they are optical, touch, or scent sensors etc., might be greatly simplified.

SUMMARY OF THE INVENTION

The present invention is based on the objective of creating a computer system of the type mentioned above that evaluates data or groups of data possessing particular characteristics so that possible responses, e.g., handling instructions for the motor systems of a robot, may be selected and evaluated in a meaningful manner.

This objective is achieved by the invention by means of a computer system with a receptor field, a processor field, a switching field, a phase circuit, and a phase program circuit, each of which is specifically configured.

The receptor field includes sensors, each of which corresponds to data with a specific characteristic (e.g., characteristics or properties A, B, or C), and which then issues an output signal characterizing this specific property. This corresponds to the "key/keyhole principle" often observed in nature, whereby a receptor, in this case the sensor, features a material/chemical structure as the "keyhole" into which only a complementary structure, the data in the simulation with the specific characteristic, will fit as the key.

The sensors are connected with links, e.g., wires, with a processor field consisting of processors; in the simulation the processors correspond to neurons in the human brain, and the connections between sensors and processors correspond to the afferent axons that lead from each sense organ to the central nervous system. This connection is a 1:1 connection i.e., each sensor is assigned to a processor or processor group.

The switching field switches the existing connections between sensors and processor on or off. This switching field corresponds in the simulation to the oligodendrozytes that surround the myelinscheiden with their arms, and can limit or release them.

By means of the phase circuit, the processors or a processor group and the switching field may be activated and deactivated in cycled time phases. In the simulation, this phase circuit corresponds to the astrozytes with their arms. The connection circuit and the phase circuit usually operate synchronously, so that a redundant release or blockage of the lines results. It is also possible that each phase circuit specifies a program section that is the basis for a common intention of the evaluations to be performed. The pertinent time phase is relatively long. With the specification, the corresponding processors responsible for the evaluation are released. The connection circuit has the task of releasing the processors responsible for the individual sections within the specified program sections in several sections, i.e., shorter time phases.

The phase program circuit controls the computer system and determines the progression of the time phases and thereby the limitation or release of the processor and the switching field associated with it by means of the phase control. The phase program circuit and some functions of the phase circuit correspond in the simulation to the glia cells that have access to an experimentally-ensured internally-generated pulsation that corresponds to the time phases queried. During a time phase, a certain combination of queried sensors, i.e., in the simulation, a combination of statuses of the receptors, is sought and checked. This "search" corresponds to the known intentional, behavior-related perception. Switching of the time phases of the phase program circuit and the connections occurs in parallel, a reference to the hypothesis that the glia possesses a spatial and temporal limit-setting function.

The temporally-cycled phase program circuit specifies the data with specific characteristics that it anticipates in the receptor field for a certain intention, for example, certain colors, shapes, etc. The data actually present at the sensors are compared with the specified data and analyzed, for example, to determine whether the anticipated data are present as distributed at the sensors, and at which sensors they are actually present.

The phase circuit activates just those processors that are provided for information processing of the anticipated phase program.

The switching field activates just those sensors that are dictated by the phase program.

Each pertinent phase program applies both to the phase circuit and to the switching field, so that these two devices are connected in parallel.

By means of the phase program circuit, for example, a primary, secondary, or tertiary analysis of the status of the receptors may result with the support of the kenogrammatics.

A primary analysis gives a response to the question whether sensors have been queried at all by the properties specified by the phase program, i.e., by specific data. For a robot, this represents a response to the query whether it is even located within a suitable environment within which a chance exists that the intended phase program may be implemented with the proper handling instructions.

A secondary analysis gives a response to the questions of how many sensors are being queried by the specific characteristics intended by the phase program, and how these sensors are distributed within the receptor field.

A tertiary analysis gives a response to the question where the sensors are positioned within the receptor field that are being queried by the specific data intended by the phase program.

Based on this, and possibly other, analyses, the computer system can determine a distribution of specific data. This may thus be used to simulate an "image" of a robot's environment. Based on this analysis and on additional buffered results from the processors, the robot's actuators and effectors, and thus the motors, may be controlled by the phase program, which then moves the receptor field in which, for example, a camera with a large number of CCD sensors may be swiveled or the entire robot may be caused to reposition itself during the simulation of optical perception, so that more suitable stimuli, i.e., data with specific characteristics more suitable for the sensors, may be adjusted for the receptor field.

Simulation of perception is thus coupled to a dynamic, handling-oriented system which corresponds to the biological perception process that likewise does not know a statistic reception mechanism: Handling instructions such as "grip the apple," for example, are directly transformed from visual input information "see the apple." Input information and handling instructions are thus isomorphic.

A formal isomorphy is produced by the phase control introduced here, namely a spatial isotopy on the one hand, and a temporal synchronization between the sensor and the motor on the other hand. Spatial isotopy means that the search for stimuli suitable for the sensors during a perception simulation depends on the prepared sensors corresponding to the phase program, their locations and orientations, and the movement of these sensors or their simulation of suitable stimuli in the "environment," and vice versa.

For the temporal synchronization, the switching field and the motors or effectors are in agreement to the extent that both systems synchronize, whereby a perfect perception or the simulation of a perception is eventually achieved via sense organs.

During processing of the phase programs generated, a large number of program paths must naturally be processed until a desired and meaningful result is achieved. The calculation time is correspondingly high, but is entirely within reason considering today's computer capabilities.

During the complete processing of individual program steps, it is possible that "senseless" or "meaningless" paths will be calculated before they are recognized to be senseless and therefore non-executable.

In order to shorten the time required to process the overall phase program, and to calculate significant results from the phase program quickly, the computer system includes a selection circuit that quasi-"jumps over" such commands during readout of those individual program commands whose execution would lead to senseless or non-executable results, thereby discarding them. Such "nonsense" program commands are buffered, so that the meaningful commands are compared with the buffered "nonsense" program commands when the program commands are read out, and may thus be removed from program execution.

The computer system starts, for example, with any particular phase program and tests which program commands created significant perception images within a certain environment. The criterion for "meaningful" might be, for example, that the computer system intentionally conducts an action corresponding to the perception. For example, the proper motor is actuated in a robot that leads to meaningful handling.

The computer system determines over time that certain program commands corresponding to a time cycle in the phase program lead to "senseless" perception images which also evince themselves in purposeless, i.e., "nonsense" actions, e.g., motor processes. However, such program commands executed in another environment might cause meaningful actions, so that consideration of the current environment is significant.

The computer system's learning process consists of having the phase programs created for a specific, targeted environment, and, based on system feedback, having program commands ignored that are unsuitable for each task in the current environment, and thereby creating a suitable action, e.g., movement of sensors.

The above-mentioned sensors address three different properties or data types, whereby the individual program commands are compiled as triplets, i.e., as a triple data set composed of a, b, and c. When triplets, for example, that have the property b in the first position are unsuitable for the creation of meaningful actions in the current environment, they are removed from the phase program. If, for example, the following phase program is present:

aaa/baa/cba/bcc/aca, then the second and fourth triplets beginning with b will be cancelled, i.e., removed, so that the following implementable phase program remains:

aaa/cba/aca.

From this brief example, one may see that the act of ignoring part of the phase program can significantly shorten it, so that the calculation time for the entire system is also shortened. Actions that are suitable and meaningful for the environment may be quickly calculated.

The function of this modified phase program circuit, which is modified by this selection circuit, is oriented to genetic code: a gene caries so-called codones, i.e., genetic words consisting of four (or possibly five) nucleotides A, T, C, and G (and possibly U), which represent a reading framework for amino acids from which in turn a certain protein is created. Comparable to this genetic mechanism, command programs are encoded based on the invention, i.e., phase program triplets represent the structure of a perception image.

A gene in turn consists alternatively of sections of nucleotides which may factor a gene (so-called exones), and sections which cannot factor a protein, so-called introns.

In order to be able to create a functional protein at all, the introns must be "spliced out" of the nucleotide sequence. In science, one speaks of a so-called "splicing mechanism." As soon as this mechanism is destroyed, in that introns are not actually cut out, non-functional "Chimera" proteins or only short-lived supported proteins (truncated proteins) come into existence. In the phase programming for the computer system based on the invention, this genetic principle means that program commands encode in the form of trigraphs, e.g., triplets of time cycles which encode unsuitable positions for a qualitative image construction for the objects of a certain environment, or tend to lead to sense deceptions within the meaning of false perceptions if these program commands are not spliced out.

Based on the invention, the selective circuit in the phase program circuit assumes the task of jumping over or discarding those program commands in the command sequence that lead to senseless actions. The computer system based on the invention is therefore not only capable of learning, but also includes self-organization that exists as an on-going optimization of meaningful perception and targeted actions, e.g., motor processes of a robot.

Moreover, the pathology of schizophrenia may be similarly described in that the sections that lead to senseless actions are not spliced out from perceptions, so that meaningful conceptualization or meaningful scenes become impossible.

Practically all genes of higher life forms have non-encoding introns that are positioned between encoding exones and that must be cut out of the sequence in order to create a messenger RNA molecule that is used for the formation of a protein. With the concept of this invention, the hypothesis may be presented of a new interpretation for the molecular splicing as a fundamental rejection mechanism that has been formed during the process, and that serves as the basis for other types of rejection, including the rejection of thoughts and impulses in the human brain that are incompatible with environmental conditions. Psychiatrists explain phantasms and hallucinations in schizophrenic patients with expressions such as "loss of ego boundaries" or "inner/outer confusion." With the new model presented here, it is suggested that the loss of the rejection function at the molecular level, i.e., the incapability to splice introns out, results in a loss of the boundary-setting function of the glia during the interaction with the nervous system. If introns are not spliced out of the genes involved in neurotransmission, various results are possible. In some cases, production of neuro-transmitters is reduced, and in other cases, the transmitter-receptor includes sequence elements and/or stop-codones encoded by introns that do not allow suitable status of the transmitters. Since these "Chimeric" receptors of the glia cannot be occupied by neuro-transmitters matching them, the deactivating or limit-setting function of synaptic transfer through glia cells may be destroyed or completely lost. The inability to discard "intronic ideas" can lead to phantasms and hallucinations, and might explain why schizophrenic patients are not capable of checking the reality of their ideas, and are firmly convinced that everything that occurs in their minds is real. It is possible that many of the concepts or thoughts of schizophrenic patients arose very early in the evolution and cannot be realized, but that some of these concepts were adapted to reality in the course of their development if the environment changes, and are no longer perceived as phantasms.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
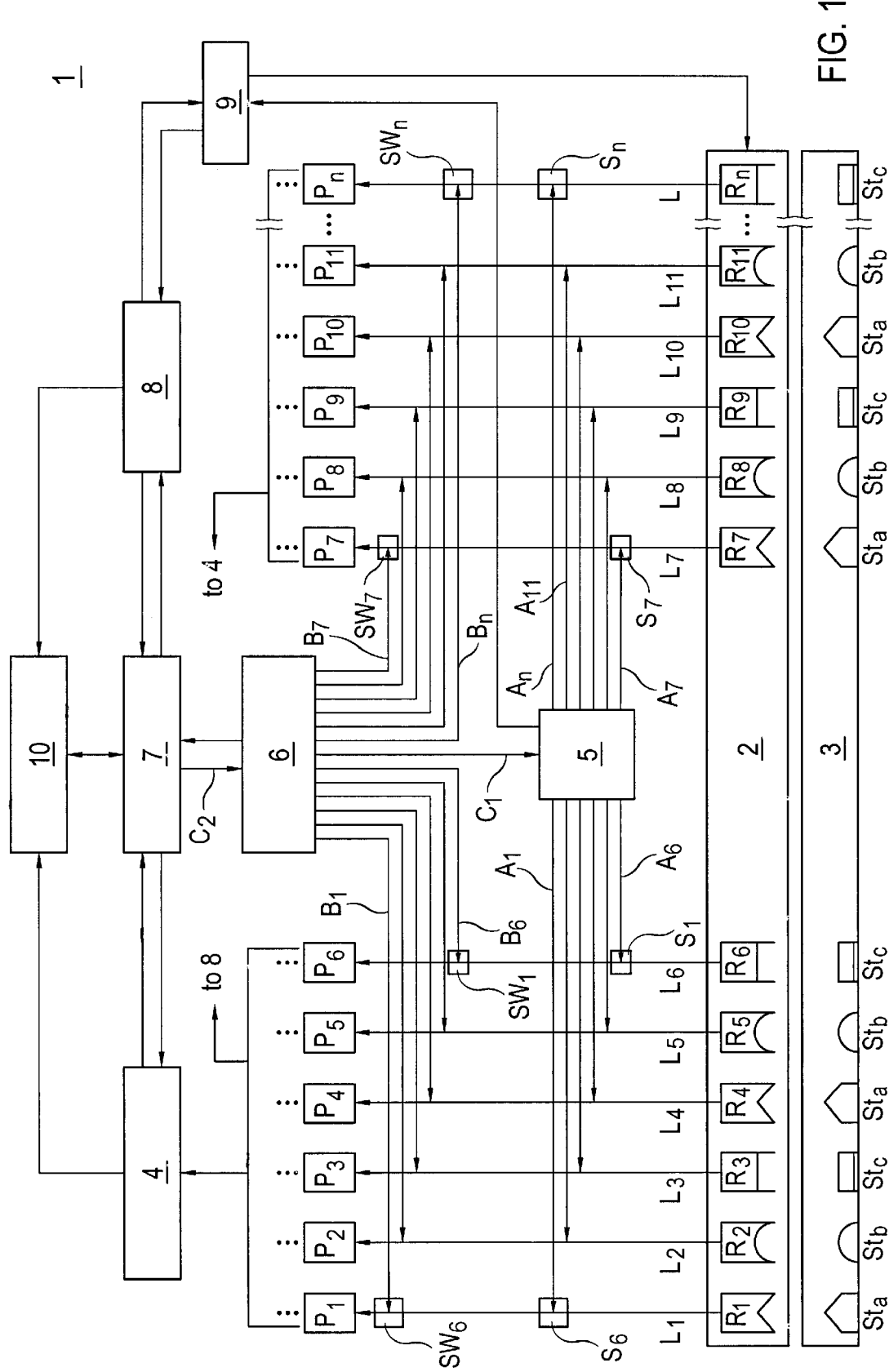
FIG. 1 is a circuit diagram of a cycled computer system for the simulation of human perception.

The preferred embodiments of the present invention will now be described with reference to FIGS. 1–4 of the drawings. Identical elements in the various figures are designated with the same reference numerals.

FIG. 1 shows a computer system for the simulation of human perception via sense organs that contains a large number of sensors $R_i$, namely sensors $R_1$, $R_2$, $R_3$, ... $R_{10}$, $R_{11}$, ... $R_n$ in a receptor field 2. These sensors are sensitive to data a, b, or c, which are represented here by different configurations of the sensors: thus, the sensors, such as $R_1$, $R_4$, etc. which have a triangular receptor surface, are sensitive to specific data a that are simulated in the illustration by stimuli $ST_a$.

Correspondingly, sensors $R_2$, $R_5$, $R_{11}$, etc. are sensitive to specific data b that supplied by stimuli $ST_b$, which here are shown to have a semi-circular receptor surface and a similar stimulus.

Further sensors such as sensors $R_3$, $R_6$, ... $R_n$ are sensitive to specific data c, which here are shown to have a quadrilateral receptor surface or correspondingly quadrilateral stimuli $ST_c$.

All stimuli are compiled in a stimulus field 3. It is clear that the stimuli are not produced by an arranged stimulus field as shown in the illustration; rather, they are presented to the computer system within the scope of a simulation of the environment in an non-arranged fashion.

Figure 2:
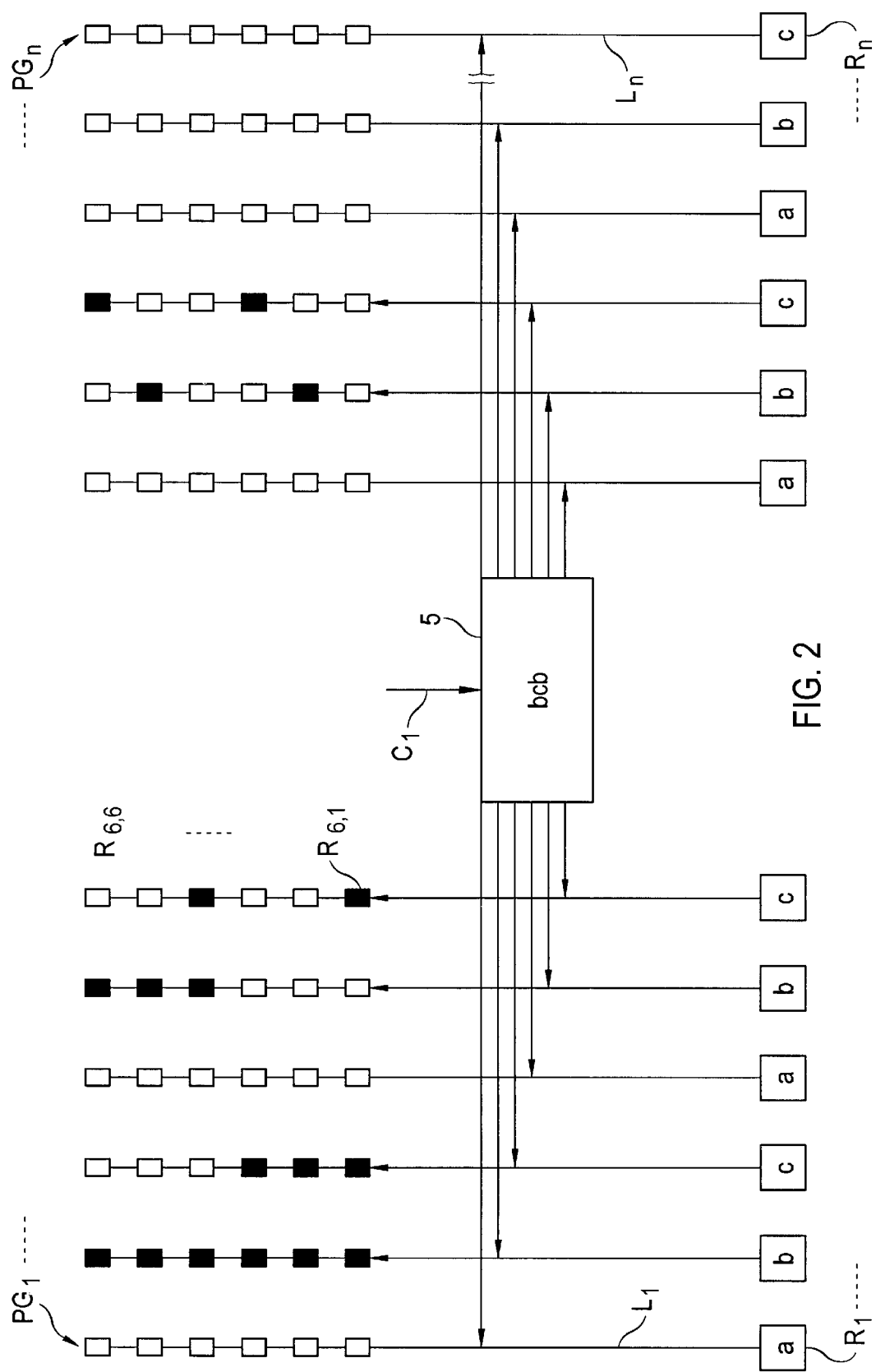
FIG. 2 is a schematic representation of the active elements of a part of the computer system in FIG. 1 during simulation of a perception.

Each sensor $R_i$ is connected with a processor $P_i$ via a line $L_i$, whereby the index i progresses from 1 to n. Instead of a processor, an entire processor group $PG_i$ consisting of several processors $P_j$, as shown by dotted lines in FIG. 2, may be provided. Such a processor group consisting of processors $P_{6.1}$, $P_{6.2}$, to $P_{6.6}$ is shown in FIG. 2.

The results calculated by processors $P_i$ are stored in a memory buffer 4.

A circuit configured as a line circuit 5 is provided that is controlled by a phase circuit 6. Lines $A_1$ to $A_n$ proceed from the line circuit 5 to corresponding lines $L_1$ to $L_n$, where they affect switches $S_1$ in the lines $L_1$, of which only the switches $S_1$, $S_6$, $S_7$ and $S_n$ are shown. These switches are pure on/off switches, so that the lines $L_i$ are either interrupted or connected by the switches.

Along with the control circuit C for the line switching 5, the phase circuit 6 includes a large number of output lines $B_i$ of which the lines $B_1$ to $B_{11}$ and $B_n$ are shown here. These line $B_i$ also lead to the connection lines $L_i$ between the sensors $R_i$ and the processors $P_1$, and control the switches $SW_i$ located in the lines there, of which only switches $SW_1$, $SW_6$, $SW_7$, and $SW_n$ are shown. As switch $S_i$, these switches $SW_i$ are pure on/off switches, so that the lines $L_i$ are either interrupted or connected by the switches as they are controlled.

The central element of this computer system is a phase program circuit 7 in which an intended program for the total computer system is embedded, and that controls the phase circuit 6 via control line $C_2$ and also the line switching directly via control line $C_1$.

Cycles are dictated to phase circuit 6 via the phase program circuit 7, whereby a cycle corresponds to the time phase in which a certain switching applies. Depending on the programming, a primary, secondary, or tertiary analysis of the status of the sensors is performed, for example, by the phase circuit. The cycled programming thus has a sampling function in that all monographs, digraphs, or trigraphs are played through or intentionally implemented, so that a certain combination of sensor statuses is sought in the simulated environment.

The processors are so arranged that exactly as many processors are assigned to each receptor as there are phases being processed by the phase program. In the case simplistically represented in FIG. 2, this is six processors per group PGi that are connected with one of the sensors $R_i$ via lines $L_i$. In this case, only three characteristics for the stimuli, i.e., three specific data types a, b, and c, are dictated; during simulation of optical perception, these could be, for example, specific characteristics "flat ground (a), "obstacle" (b), and "small objects on the floor" (c). Naturally, considerably more sensors and considerably more specific characteristics would be necessary for a complete simulation of optical perception.

In the simplistic representation in FIG. 2, only those sensors that may be assigned the named characteristics $R_1$ to $R_n$ are shown as small boxes that are each connected to a processor group $PG_1$ to $PG_n$. Each processor group $PG_i$ consists of six processors whereby, as mentioned above, only those processors of the sixth group are designated as $P_{6.1}$ through $P_{6.6}$.

FIG. 2 shows only the line circuit 5 from the computer system shown in the upper part of FIG. 1, whereby a trigraph of the specific characteristics b, c, b are specified on the line circuit block, which are processed in six steps corresponding to the six processors based on the phase program.

One may see from FIG. 2 that the sensors occupied by specific characteristics "b" and "c" are switched through, and that some processors are already acting in the pertinent processor groups (designated by black boxes). One may also see that, for example, no processor is active in the processor group $PG_n$, which leads to the conclusion that the sensor $R_n$ is not occupied. Since neither the sensors nor the processors that process the specific characteristic "a" are being queried by the trigraph, the corresponding processor groups are not active.

During the processing of the distribution of specific characteristics specified by the trigraph, the line circuit 5 must perform the following number of switchings in the arrangement of sensors for the computer system shown:

For primary analysis ("Is a suitable stimulation of the three specific characteristics occurring at all?"), two switchings;

For secondary analysis ("What is the distribution of the specific characteristics queried?"), 24 switchings; and For tertiary analysis ("How many of the specific characteristics are present at the sensor?"), 12 switchings.

As may be derived from the diagram in FIG. 2, only matching stimuli are accepted for the pre-determined phase program, while non-matching stimuli, i.e., those that do not correspond to the phase program, are discarded. This alternation between acceptance and rejection is a characteristic of subjective intentional systems. A system's ability to reject is an "index of its subjectivity," which means that the implementation of intentions requires not only the identification of matching objects, but also the simultaneous discarding of present objects that are not intended.

In order to dynamically configure the statistical computer system described, and thus to optimally simulate perception, as mentioned above, a motor program circuit 8 is connected with the computer system that interacts with the phase program circuit 7 via bi-directional lines, and is controlled by it in accordance with each phase program step. This motor program circuit controls effectors 9 that affect the receptor field 2, for example, in order to displace it, thus achieving a better reception of stimuli by the individual sensors. The effectors might also serve to reposition a complete robot, as mentioned above.

The line circuit 5 also acts directly on the effectors 9 or their control circuits, which report each phase program step to be processed to the effectors, so that the effectors may be correspondingly controlled.

It must be mentioned for the sake of completeness that another comparator circuit 10 may be provided that contains data from the memory buffer 4, the motor program circuit 8, and the phase programming circuit 7, whereby communication with the phase program circuit 7 is bi-directional. The available data may be compared after suitable transformation in order to determine how well the intended phase program was processed. Based on this result, the phase program may be altered, or the computer system may be placed into another condition, e.g. by movement of the sensors or repositioning of the robot. In this case, the decision falls to the computer system whether it should continue to attempt to find the characteristics corresponding to the phase program, or whether it should alter the phase program with the help of the memory buffer 4.

The perception mechanism presented may be viewed as a guitarist who hears a melody in his head and wants to hear how it really sounds. He wants to perceive it. He picks up his guitar and presses the strings with his left had at exactly those points that correspond to his desired melody. The melody therefore dictates where the strings must be pressed.

Regarding the perception mechanism, this means that the phase program determines which lines must be released by the switching mechanism for a certain time period. Since the melody consists of varying combinations of sounds or notes, the grip on the guitar must be constantly changed, which corresponds to a change in the phase program. Earlier, the guitar did not produce any sound by itself except for the minor sounds caused by placing fingers on the strings. The guitar player must first strike the strings with his right hand (or guitar pick). This process corresponds to stimulation of the sensors. This takes into account the combination of how the guitarist uses the strings of his instrument. This mechanism of creating a melody requires no logical calculations, but rather takes advantage of the possibilities of use of the instrument in time cycles.

During actual perception via sense organs, the cyclical time phases observed here might be genetically determined, whereby clock genes might be responsible for this. The phase programs that may be considered to be intentional or behavior-dependent might be "composed" by the astrozytes by means of preparation of the neuron synapses. The astrozytes would then be dictated via lines to the oligodendrozytes by this "diagnostic" program, i.e., suitable stimuli for the sensors would be sought within the scope of a suitable environment.

The axons are thus computing combinatory lines that process the stimulation at the receptors by phase, which in turn leads to spatial and temporal synchronization of neuron systems. In this manner, neuron synchronization has occurred "orthogonally,: i.e., via the axons, so that a direct connection, a so-called "linking" between the neurons is not absolutely required.

The individual elements of the computer system possibly have varying time cycles, and must therefore produce an integrated behavior. As a paradigm, one might consider an orchestra with no director, whereby each musician is familiar with the entire score. With his instrument, he plays that part that is assigned to him in the score. If a musician were to play alone, there would be no reason to know the entire score, since he cannot know how the entire symphony sounds. On the other hand, if all musicians play together, then each hears what he himself is playing and what he is not playing, i.e., what the other musicians are playing. An individual limit-setting from experience occurs based on many individual activities. Since all musicians have the score in their heads, they basically do not require a director to order the cycles and parts.

Figure 3:
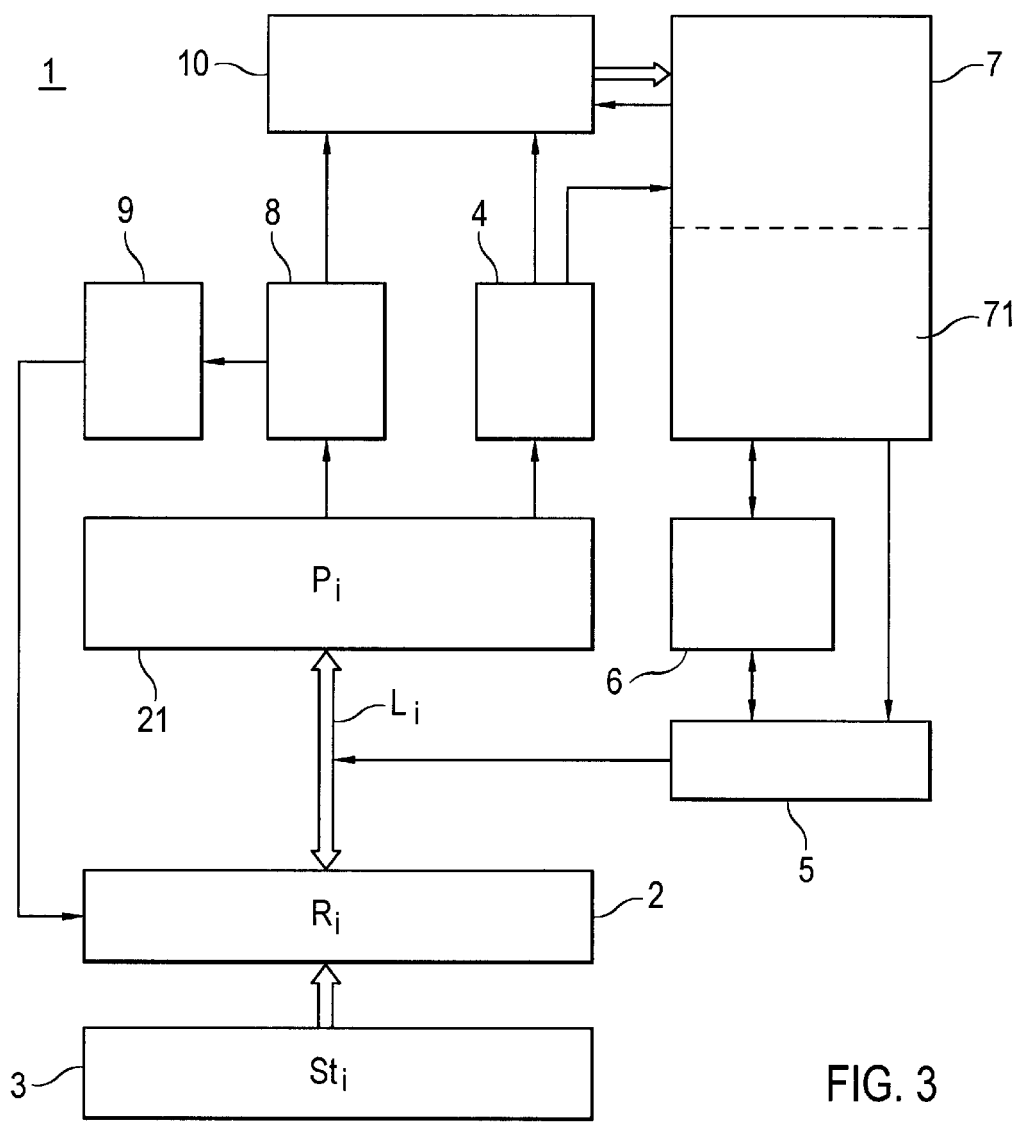
FIG. 3 is a schematic flow chart of a modified computer system with a selection circuit based on the invention to splice out individual program commands.

FIG. 3 shows a modified computer system 1 used to simulate human perception via sense organs. The computer system is the same as the one in FIG. 1 regarding main components, and therefore includes a receptor field 2 in which a number of sensors $R_i$ is present which are sensitive to specific data and may be excited by corresponding stimuli $St_i$ that are compiled in a stimulus field 3. All sensors $R_i$ are connected via a line system $L_i$ with processors $P_i$ that are here collected into a processor field 21. The results computed from the individual processors $P_i$ are stored in a memory buffer 4. The line system $L_i$ may be activated or deactivated via a switching field 5, i.e., so that individual lines between individual sensors $R_i$ and assigned processors $P_i$ may be blocked or connected. The switching field 5 is controlled by a phase circuit 6 and a phase program circuit 7 representing the central element of the computer system, whereby the phase circuit 6 and phase program circuit 7 alternately communicate with each other. The phase program circuit 7 dictates cycles to the phase circuit 6, whereby one cycle corresponds to a time phase in which a specified switching applies. With each cycle, a series of program commands is issued that, as explained above, consist of so-called trigraphs, for example. Corresponding to these program commands the processors $P_i$ are correspondingly activated or deactivated via the switching field 5 by means of the phase circuit 6 and the sensors $R_i$, so that the program commands are processed accordingly. The results from processors $P_i$ are fed to a motor programming circuit 8, for example, that controls effectors 9, which in turn cause an action such as the movement of individual receptors $R_i$.

Further, a comparator circuit 10 is in turn provided that receives data from the memory buffer 4, the motor program circuit 8, and the phase program circuit 7. This comparator circuit determines how well the intended phase program was processed, so that the phase program is altered as necessary, or the computer system is placed into another condition as necessary, such as by the movement of sensors or dislocation of a robot equipped with a computer system.

The function of this computer system is identical to the embodiment example above from FIGS. 1 and 2.

The modification to the computer system above consists of the fact that a selection circuit 71 is a part of the phase program circuit 7 that continuously checks the issued program commands with respect to the current status of the computer system to determine whether the processing of individual program commands is meaningful or not.

Figure 4:
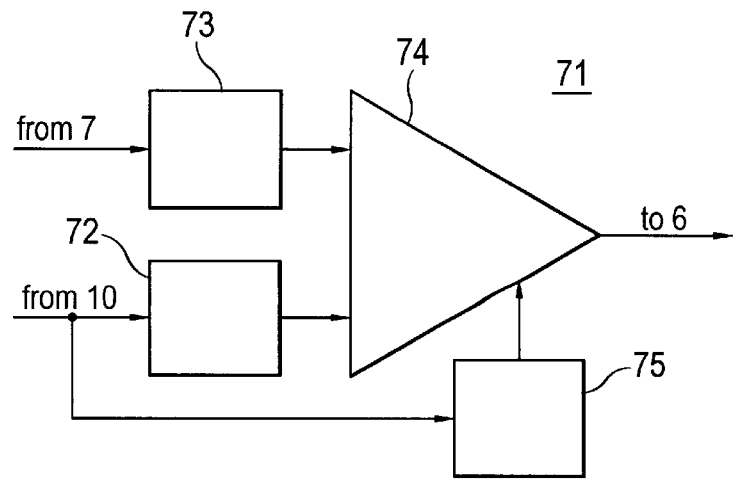
FIG. 4 is another flow chart explaining the function of the selection circuit.

This selection circuit 71, shown schematically in FIG. 4, contains a dictating memory buffer 72 in which individual program commands are stored that are meaningful (or not meaningful) for the current dictates of the computer system. As mentioned above, for example, program commands might lead to meaningless actions for that condition that have "b" data in their first position. The information regarding such senseless or meaningful is sent to the dictating memory buffer via comparator circuit 10, for example, in which each quality of processing of the specified programs is checked. Of course further dictates are also possible. The program commands to be processed are delivered from a program command buffer 73 of the phase program circuit 7. These program commands are examined in a comparator 74 along with those program commands stored in the dictating memory buffer 72 regarding whether each program command is meaningful or not. Thus, additional task assignments from a task assignment circuit 75 may be adjusted correspondingly; the task assignment circuit 75 also receives data from the comparator 10, for example. Program commands recognized to be senseless or unsuitable are then "spliced out" of the program command sequence, i.e., discarded. During processing of the program command sequence, these "senseless" program commands are ignored, and only the abbreviated program command sequence is passed to the phase circuit 6.

There has thus been shown and described a novel computer system, particularly for simulation of human perception via sense organs which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Computer system used to determine and evaluate data or groups of data that each possess a specific property (a, b, c), particularly used to simulate human perception via sense organs, said system comprising:

a receptor field with sensors ($R_i$), that each correspond to data of a specific property (a, b, c) and then issue a output signal characterizing that property;

a processor field with processors ($P_i$, $P_{i/k}$), that are each assigned to a sensor ($R_i$) via lines ($L_i$) containing output signals from the sensors ($R_i$);

a switching field to switch on or off individual connections (Li) between the sensors ($R_i$) and the processors ($P_i$, $P_{i/k}$);

a phase circuit that activates and deactivates the switching field and the processors ($P_i$, $P_{i/k}$) in cycled time phases; and a phase program circuit that communicates with a phase circuit and determines a progression of the cycled time phases and an associated control of the processors ($P_i$, $P_{i/k}$) and the switching field via the phase circuit, wherein anticipated data dictated by the phase program circuit and its possible distribution to the sensors ($R_i$)

are compared with data actually present there, and a program is preserved or altered based on this comparison.

2. Computer system as in claim 1, wherein a processor group ($PG_i$) containing several processors ($P_i$, $P_{i/k}$) each is assigned to each sensor ($R_i$).

3. Computer system as in claim 1, wherein switches ($S_i$) are positioned in the lines ($L_i$) between the sensors ($R_i$) and the processor ($P_i$) that are controlled by the switching field and either block or connect an assigned line based on an analysis program present.

4. Computer system as in claim 1, wherein additional switches ($SW_i$) are positioned in lines between the sensors ($R_i$) and the processors ($P_i$, $P_{i/k}$) that are controlled by the phase circuit based on the program dictated by the phase program circuit, and either block or connect the assigned line ($L_i$).

5. Computer system as in claim 1, wherein a motor program circuit is connected with the phase program circuit that causes effectors to at least move the receptor field.

6. Computer system as in claim 5, wherein the motor program circuit is connected with the outputs of at least one of the processors ($P_i$) and the processor groups ($PG_i$).

7. Computer system as in claim 5, wherein the switching field is connected with a circuit used to control the effectors.

8. Computer system as in claim 1, wherein the phase program circuit includes a selection circuit that continuously checks dictated program commands as to whether their implementation is meaningful for a current computer system status or not, and that removes those program commands that lead to a senseless action.

9. Computer system as in claim 8, wherein the selection circuit includes a dictating memory buffer in which at least the program commands to be removed from the program command sequence are stored, and wherein a comparator is provided that compares the command programs delivered by the phase program circuit with the program commands stored in the dictating memory buffer.

10. Computer system as in claim 8, wherein a dictating memory buffer is connected with a result comparator computer system that examines a result of the processed program commands for effectiveness and writes to a dictating memory buffer those program commands that have led to an unsuitable result.

11. Computer system as in claim 1, wherein a comparator in the phase program circuit is controlled by a task assignment control from which task assignments are sent to the comparator in the form of program commands.

* * * * *